United States Patent
Veitch et al.

(10) Patent No.: US 12,551,302 B2
(45) Date of Patent: Feb. 17, 2026

(54) CONTROLLING A SURGICAL INSTRUMENT

(71) Applicant: CMR SURGICAL LIMITED, Cambridgeshire (GB)

(72) Inventors: Graham John Veitch, Cambridge (GB); David William Haydn Webster-Smith, Cambridge (GB); Roy Andrew Glasscock, Cambridge (GB)

(73) Assignee: CMR SURGICAL LIMITED, Cambridge (GB)

( * ) Notice: Subject to any disclaimer, the term of this patent is extended or adjusted under 35 U.S.C. 154(b) by 474 days.

(21) Appl. No.: 18/012,431

(22) PCT Filed: Jun. 28, 2021

(86) PCT No.: PCT/GB2021/051633
§ 371 (c)(1),
(2) Date: Dec. 22, 2022

(87) PCT Pub. No.: WO2022/003331
PCT Pub. Date: Jan. 6, 2022

(65) Prior Publication Data
US 2023/0233275 A1    Jul. 27, 2023

(30) Foreign Application Priority Data
Jun. 30, 2020    (GB) .................................... 2009971

(51) Int. Cl.
*A61B 34/30*    (2016.01)
*A61B 34/00*    (2016.01)
*A61B 90/00*    (2016.01)

(52) U.S. Cl.
CPC .............. *A61B 34/30* (2016.02); *A61B 34/70* (2016.02); *A61B 2090/064* (2016.02)

(58) Field of Classification Search
CPC ......... A61B 34/30; A61B 34/70; A61B 34/37; A61B 34/74; A61B 34/77; A61B 34/35; A61B 2090/064; A61B 2090/067
(Continued)

(56) References Cited

U.S. PATENT DOCUMENTS 7,443,115 B2 * 10/2008 Okamoto .............. B25J 13/083
10,166,082 B1    1/2019 Hariri et al.
(Continued)

FOREIGN PATENT DOCUMENTS

EP         1415772 A2    5/2004
JP         201334832 A   2/2013
(Continued)

OTHER PUBLICATIONS

Japanese Notification of Reasons for Refusal from corresponding Japanese Application No. 2022-515944 dated Mar. 28, 2023.
(Continued)

*Primary Examiner* — Ramon A. Mercado
*Assistant Examiner* — Ellis B. Ramirez
(74) *Attorney, Agent, or Firm* — Lando & Anastasi, LLP

(57) ABSTRACT

A control system for controlling manipulation of a surgical instrument in response to manipulation of a remote surgeon input device. The surgical instrument comprises opposable first and second end effector elements connected to a shaft by an articulated coupling. The control system: transforms commands from the surgeon input device to alter the opening angle between the first and second end effector elements according to a first control relationship to drive signals to drive the first and second end effector elements to rotate; receives sensed forces applied to the first and second end effector elements, and compares the sensed forces to a threshold force; and upon determining that the threshold force has been exceeded, transforms subsequent commands
(Continued)

from the surgeon input device to alter the opening angle between the first and second end effector elements according to a second control relationship to drive signals to drive the first and second end effector elements to rotate, wherein the second control relationship is different to the first control relationship.

19 Claims, 13 Drawing Sheets

(58) Field of Classification Search
USPC ......... 700/253; 901/30, 34; 318/568.21, 676
See application file for complete search history.

(56) References Cited

U.S. PATENT DOCUMENTS

| | | | |
|---|---|---|---|
| 2004/0140787 A1 | 7/2004 | Okamoto et al. | |
| 2008/0255608 A1* | 10/2008 | Hinman | ................. A61B 17/29 |
| 2013/0066333 A1 | 3/2013 | Hyodo | |
| 2013/0103050 A1 | 4/2013 | Richmond et al. | |
| 2014/0148819 A1* | 5/2014 | Inoue | ....................... B25J 13/02 |
| 2014/0343569 A1 | 11/2014 | Turner | |
| 2016/0256184 A1* | 9/2016 | Shelton, IV | ......... A61B 17/295 |
| 2019/0125432 A1* | 5/2019 | Shelton, IV | ....... A61B 17/1285 |
| 2019/0298398 A1* | 10/2019 | Wellman | .............. A61B 17/282 |

FOREIGN PATENT DOCUMENTS

| | | |
|---|---|---|
| JP | 201334851 A | 2/2013 |
| WO | 2013018935 A1 | 2/2013 |
| WO | 2017098989 A1 | 6/2017 |

OTHER PUBLICATIONS

Notification of Transmittal of the International Search Report and the Written Opinion of the International Searching Authority from corresponding PCT/GB2021/051633 dated Sep. 30, 2021.

United Kingdom Search Report from corresponding United Kingdom Application No. 2009971.9 dated Dec. 16, 2020.

* cited by examiner

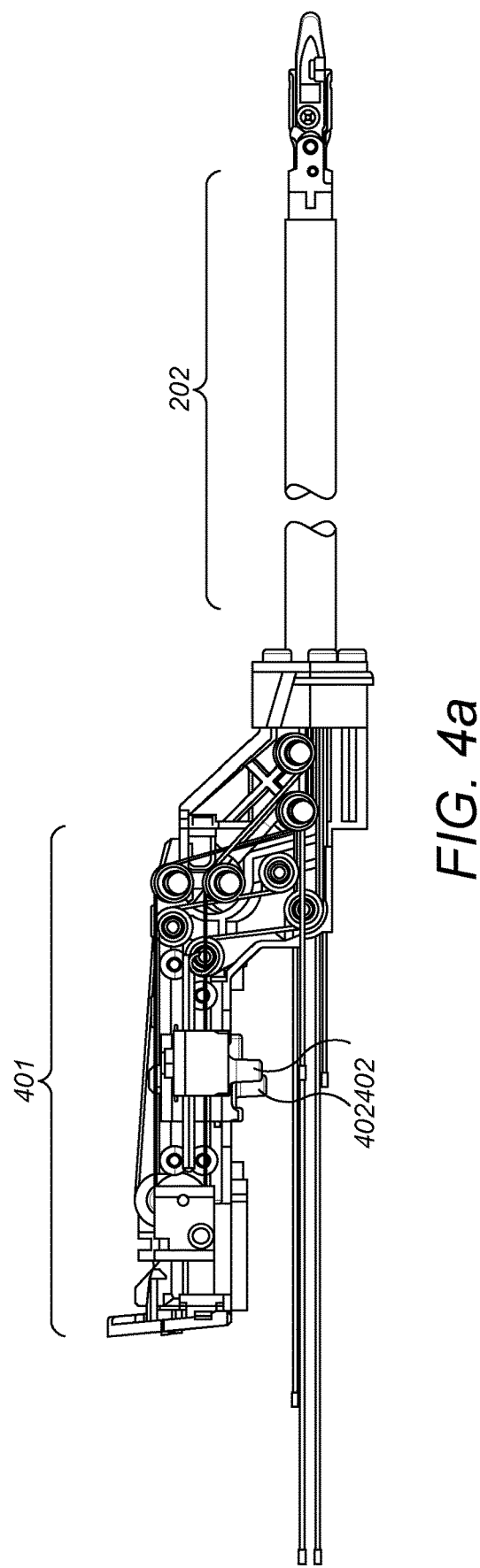

CONTROLLING A SURGICAL INSTRUMENT

CROSS-REFERENCE TO RELATED APPLICATIONS

This application is a U.S. National Phase Application under 35 U.S.C. § 371 of International Application No. PCT/GB2021/051633, filed Jun. 28, 2021, which claims priority to United Kingdom Application No. 2009971.9, filed Jun. 30, 2020. Each application referenced above is hereby incorporated by reference in its entirety for all purposes.

BACKGROUND

It is known to use robots for assisting and performing surgery. FIG. 1 illustrates a typical surgical robotic system. A surgical robot 100 consists of a base 102, an arm 104 and an instrument 106. The base supports the robot, and may itself be attached rigidly to, for example, the operating theatre floor, the operating theatre ceiling or a cart. The arm extends between the base and the instrument. The arm is articulated by means of multiple flexible joints 108 along its length, which are used to locate the surgical instrument in a desired location relative to the patient. The surgical instrument is attached to the distal end of the robot arm. The surgical instrument penetrates the body of the patient at a port so as to access the surgical site. The surgical instrument comprises a shaft connected to a distal end effector 110 by a jointed articulation. The end effector engages in a surgical procedure. In FIG. 1, the illustrated end effector is a pair of jaws. A surgeon controls the surgical robot 100 via a remote surgeon console 112. The surgeon console comprises one or more surgeon input devices 114. These may take the form of a hand controller or foot pedal. The surgeon console also comprises a display 116.

A control system 118 connects the surgeon console 112 to the surgical robot 100. The control system receives inputs from the surgeon input device(s) and converts these to control signals to move the joints of the robot arm 104 and end effector 110. The control system sends these control signals to the robot, where the corresponding joints are driven accordingly.

For example, the surgeon input device 114 may be a hand controller which has two portions moveable relative to each other, for example a trigger moveable relative to a body. The surgeon may move the trigger relative to the body to cause the jaws of the end effector 110 to open and close. Typically, the surgeon's movements are on a larger scale than the intended movement of the jaws. The control system transforms the inputs received from the hand controller to drive signals for driving the jaws to open or close according to a control relationship. That control relationship usefully scales the inputs from the hand controller so as to enable small and precise movements of the jaws in response to larger scale movement of the hand controller by the surgeon.

The control relationship is generally such that movement of the trigger over its whole range of motion is mapped to movement of the opening angle between the jaws over its whole range from fully open to closed. In isolation, this enables the fine control of the jaws described above. However, in the presence of external forces applied to the jaws, such as from tissue surrounding the jaws at the surgical site, this delicate control may be insufficient to cause the desired movement of the jaws.

Thus, there is a need for a control system which better converts inputs received from the surgeon input device(s) to control signals to move the end effector as desired in the presence of the external environment at the end effector.

SUMMARY OF THE INVENTION

According to an aspect of the invention, there is provided a control system for controlling manipulation of a surgical instrument in response to manipulation of a remote surgeon input device, the surgical instrument comprising opposable first and second end effector elements connected to a shaft by an articulated coupling, the control system configured to: transform commands from the surgeon input device to alter the opening angle between the first and second end effector elements according to a first control relationship to drive signals to drive the first and second end effector elements to rotate; receive sensed forces applied to the first and second end effector elements, and compare the sensed forces to a threshold force; and upon determining that the threshold force has been exceeded, transform subsequent commands from the surgeon input device to alter the opening angle between the first and second end effector elements according to a second control relationship to drive signals to drive the first and second end effector elements to rotate, wherein the second control relationship is different to the first control relationship.

The surgeon input device may comprise two portions movable relative to each other. The first control relationship may be a position control relationship, and the second control relationship may be a position control relationship, where in a position control relationship the relative position of the two portions of the surgeon input device maps directly to the relative position of the first and second end effector elements of the surgical instrument.

The sensed forces may be applied in a direction so as to close the first and second end effector elements together.

The opening angle between the first and second end effector elements may be in a range bounded by a maximum opening angle $\theta_{max}$, and the threshold force may be the received sensed force applied to the first and second end effector elements when (i) no external load is applied to the first and second end effector elements, and (ii) the opening angle between the first and second end effector elements is the maximum opening angle $\theta_{max}$.

Under the same command from the surgeon input device, the control system may be configured to drive: the first and second end effector elements to rotate according to the first control relationship to an opening angle of $\theta$, and the first and second end effector elements to rotate according to the second control relationship to an opening angle of $\theta+\Delta\theta$, where $\Delta\theta>0$. $\Delta\theta$ may be a function of the sensed forces.

One or more motors may be configured to drive the first and second end effector elements to rotate according to the drive signals, those one or more motors each capable of generating a maximum torque, wherein $\Delta\theta$ has a maximum value of $\Delta\theta_{max}$, where $\theta+\Delta\theta_{max}$ is the opening angle between the first and second end effector elements driven by the one or more motors at maximum torque when no external load is applied to the first and second end effector elements.

The control system may model the driving of the first and second end effector elements as a spring, wherein $\Delta\theta$ is a function of a spring constant $K_e$.

The control system may provide a continuous mapping from the surgeon input device to the first and second end effector elements when transitioning from transforming commands from the surgeon input device according to the first control relationship to transforming subsequent commands from the surgeon input device according to the second control relationship.

Δθ may satisfy the following relationship:

$$\Delta\theta = \min\left(\frac{f_e}{K_e}\theta_{cont}, \Delta\theta_{max}\right)$$

wherein $f_e$ is an opening strain force between the first and second end effector elements derived from the received sensed forces, and $\theta_{cont}$ is a function of the opening angle θ which provides the continuous mapping.

The control system may only transform subsequent commands from the surgeon input device according to the second control relationship if the opening angle θ between the first and second end effector elements is greater than a baseline opening angle $\theta_{base}$.

$\theta_{cont}$ may satisfy the following relationship:

$$\theta_{cont} = \frac{(\theta - \theta_{base})}{(\theta_{max} - \theta_{base})}.$$

The surgical instrument may be a robotic surgical instrument held and driven by a robotic surgical arm, the robotic surgical arm comprising an instrument drive configured to transfer drive from the one or more motors to the first and second end effector elements, wherein the sensed forces that the control system is configured to receive are measured at the instrument drive.

The instrument drive may comprise a first joint which transfers drive from a first motor of the one or more motors to rotation of the first end effector element, and a second joint which transfers drive from a second motor of the one or more motors to rotation of the second end effector element, wherein the opening strain force between the first and second end effector elements is:

$$f_e = \max(f_{sens} - f_d, 0)$$

where $f_{sens}$ is a function of a force $f_1$ sensed at the first joint of the instrument drive and a force $f_2$ sensed at the second joint of the instrument drive, and $f_d$ is a received sensed force applied to the first and second end effector elements when (i) no external load is applied to the first and second end effector elements, and (ii) the opening angle between the first and second end effector elements is the maximum opening angle $\theta_{max}$.

The control system may calculate $f_{sens}$ according to the equation $$f_{sens} = f_1 + f_2.$$

The control system may calculate $f_{sens}$ according to the equation $$f_{sens} = (f_1 + f_2) - (f_{1base} + f_{2base})$$

where $f_{1base}$ is a force sensed at the first joint of the instrument drive at a baseline opening angle $\theta_{base}$ between the first and second end effector elements, and $f_{2base}$ is a force sensed at the second joint of the instrument drive at the baseline opening angle $\theta_{base}$ between the first and second end effector elements.

The control system may calculate $f_{sens}$ iteratively as a filtered version of $$\Delta f = (f_1 + f_2) - (f_{1base} + f_{2base})$$

according to the equation $$f_{sens_n} = \alpha \Delta f_n + (1-\alpha) f_{sens_{n-1}}$$

where $f_{1base}$ is a force sensed at the first joint of the instrument drive at a baseline opening angle $\theta_{base}$ between the first and second end effector elements, $f_{2base}$ is a force sensed at the second joint of the instrument drive at the baseline opening angle $\theta_{base}$ between the first and second end effector elements, $f_{sens_n}$ is $f_{sens}$ from the current iterative cycle, $f_{sens_{n-1}}$ is $f_{sens}$ from the previous iterative cycle, and α is a filter constant.

The sensed forces may be applied in a direction so as to open the first and second end effector elements apart, and the threshold force is a gripping force.

Under the same command from the surgeon input device, the control system may be configured to drive: the first and second end effector elements to rotate according to the first control relationship to an opening angle of θ, and the first and second end effector elements to rotate according to the second control relationship to an opening angle of θ−Δθ, where Δθ>0.

One or both of the first control relationship and the second control relationship may be a force control relationship, where in a force control relationship a force applied to the surgeon input device maps directly to a force applied to the first and second end effector elements of the surgical instrument.

BRIEF DESCRIPTION OF THE FIGURES

The present invention will now be described by way of example with reference to the accompanying drawings. In the drawings.

DETAILED DESCRIPTION

The following describes controlling a surgical robotic instrument from a remote surgeon console. The instrument and console form part of a surgical robotic system of the type illustrated in FIG. 1.

The surgical instrument is supported by the robot arm. The robot arm is itself supported by a base. During surgery, the base is secured to part of the operating theatre, for example the floor, ceiling, cart or patient bed. The robot arm remains at all times external to the patient. The robot arm comprises a series of arm links interspersed with joints. These joints may be revolute joints. The end of the robot arm distal to the base can be articulated relative to the base by movement of one or more of the joints. The surgical instrument attaches to a drive assembly at the distal end of the robot arm. This attachment point is external to the patient.

The surgical instrument has an elongate profile, with a shaft spanning between its proximal end which attaches to the robot arm and its distal end which accesses the surgical site within the patient body. The proximal end of the surgical instrument and the instrument shaft may be rigid with respect to each other and rigid with respect to the distal end of the robot arm when attached to it. An incision is made into the patient body, through which a port is inserted. The surgical instrument may penetrate the patient body through the port to access the surgical site. Alternatively, the surgical instrument may penetrate the body through a natural orifice of the body to access the surgical site. At the proximal end of the instrument, the shaft is connected to an instrument interface. The instrument interface engages with the drive assembly at the distal end of the robot arm. Specifically, individual instrument interface elements of the instrument interface each engage a respective individual drive assembly interface element of the drive assembly. The instrument interface is releasably engageable with the drive assembly. The instrument can be detached from the robot arm manually without requiring any tools. This enables the instrument to be detached from the drive assembly quickly and another instrument attached during an operation.

Figure 2A:
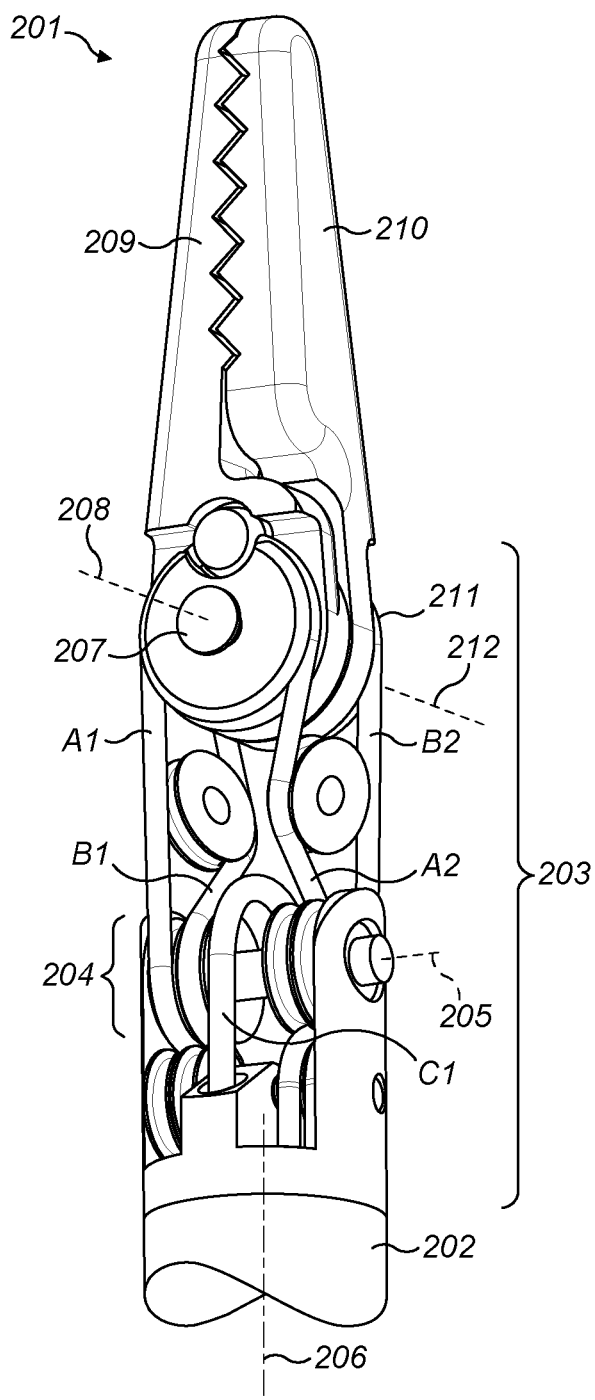
FIGS. 2a and 2b illustrate the distal end of an exemplary surgical instrument.
Figure 2B:
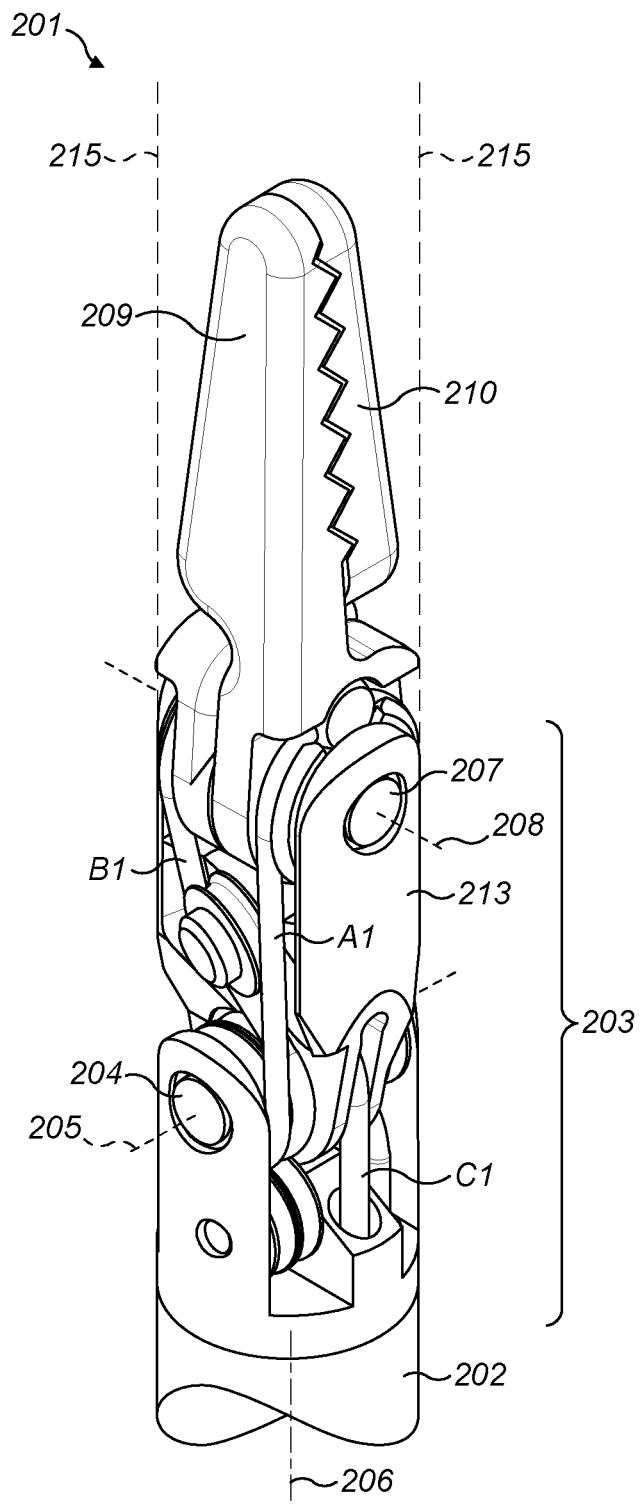

At the distal end of the surgical instrument, the distal end of the shaft is connected to an end effector by an articulated coupling. The end effector engages in a surgical procedure at the surgical site. FIGS. 2a and 2b illustrate the distal end of an exemplary instrument which has a pair of jaws as the end effector 201. The shaft 202 is connected to the end effector 201 by articulated coupling 203. The articulated coupling 203 comprises several joints. These joints enable the pose of the end effector to be altered relative to the direction of the instrument shaft. Although not shown in FIGS. 2a and 2b, the end effector may also comprise joint(s). In the example of FIGS. 2a and 2b, the articulated coupling 203 comprises a pitch joint 204. The pitch joint 204 rotates about pitch axis 205, which is perpendicular to the longitudinal axis 206 of the shaft 202. The pitch joint 204 permits a supporting body 213 (described below) and hence the end effector 201 to rotate about the pitch axis 205 relative to the shaft. In the example of FIGS. 2a and 2b, the articulated coupling also comprises a first yaw joint 207 and a second yaw joint 211. First yaw joint 207 rotates about first yaw axis 208. Second yaw joint 211 rotates about second yaw axis 212. Both yaw axes 208 and 212 are perpendicular to pitch axis 205. Yaw axes 208 and 212 may be parallel. Yaw axes 208 and 212 may be collinear. The articulated coupling 203 comprises a supporting body 213. At one end, the supporting body 213 is connected to the shaft 202 by pitch joint 204. At its other end, the supporting body 213 is connected to the end effector 201 by the yaw joints 207 and 211. This supporting body is omitted from FIG. 2a for ease of illustration so as to enable the other structure of the articulated coupling to be more easily seen. The end effector 201 shown comprises two end effector elements 209, 210. Alternatively, the end effector may have a single end effector element. The end effector elements 209, 210 shown in FIGS. 2a and 2b are opposing jaws. However, the end effector elements may be any type of opposing end effector elements. The first yaw joint 207 is fast with the first end effector element 209 and permits the first end effector element 209 to rotate about the first yaw axis 208 relative to the supporting body 213 and the pitch joint 204. The second yaw joint 211 is fast with the second end effector element 210 and permits the second end effector element 210 to rotate about the second yaw axis 212 relative to the supporting body 213 and the pitch joint 204. In FIG. 2a, the end effector elements 209, 210 are shown in a closed configuration in which the jaws abut.

The joints illustrated in FIGS. 2a and 2b are driven by pairs of driving elements. The driving elements are elongate. They are flexible transverse to their longitudinal extent. They resist compression and tension forces along their longitudinal extent. Each pair of driving elements is secured at the other end of the instrument shaft to a respective instrument interface element of the instrument interface. Thus, the robot arm transfers drive to the end effector as follows: movement of a drive assembly interface element moves an instrument interface element which moves a driving element which moves one or more joints of the articulation and/or end effector which moves the end effector. The driving elements may be cables. The driving elements may comprise flexible portions and a rigid portion. Flexible portions engage the components of the instrument interface and the articulated coupling, and the rigid portion extends through all or part of the instrument shaft. For example, the flexible portion may be a cable, and the rigid portion may be a spoke. Other rigid portion(s) may be in the instrument interface or articulated coupling of the instrument. For example, rack and pinions may be in the instrument interface or articulated coupling of the instrument.

FIGS. 2a and 2b illustrate a first pair of driving elements A1, A2 which are constrained to move around the first yaw joint 207. Driving elements A1, A2 drive rotation of the first end effector element 209 about the first yaw axis 208. FIGS. 2a and 2b illustrate a second pair of driving elements B1, B2 which are constrained to move around the second yaw joint 211. Driving elements B1, B2 drive rotation of the second end effector element 210 about the second yaw axis 212. FIGS. 2a and 2b also illustrate a third pair of driving elements C1, C2 which are constrained to move around pitch joint 204. Driving elements C1, C2 drive rotation of the end effector 201 about the pitch axis 205. The end effector 201 can be rotated about the pitch axis 205 by applying tension to driving elements C1 and/or C2. The pitch joint 204 and yaw joints 207, 211 are independently driven by their respective driving elements.

The end effector elements 209 and 210 are independently rotatable. The end effector elements can be rotated in opposing rotational directions. For example, the end effector elements can be rotated in opposing rotational directions towards each other by applying tension to driving elements A2 and B1. The end effector elements can be rotated in opposing rotational directions away from each other by applying tension to driving elements A1 and B2. Both end effector elements can be rotated in the same rotational direction, by applying tension to driving elements A1 and B1 or alternatively A2 and B2. This causes the end effector elements to yaw about the pivot axes 208 and 212. Alternatively, one end effector element can be rotated (in either rotational direction) whilst the other end effector element is maintained in position, by applying tension to only one of driving elements A1, A2, B1, B2.

Figure 3:
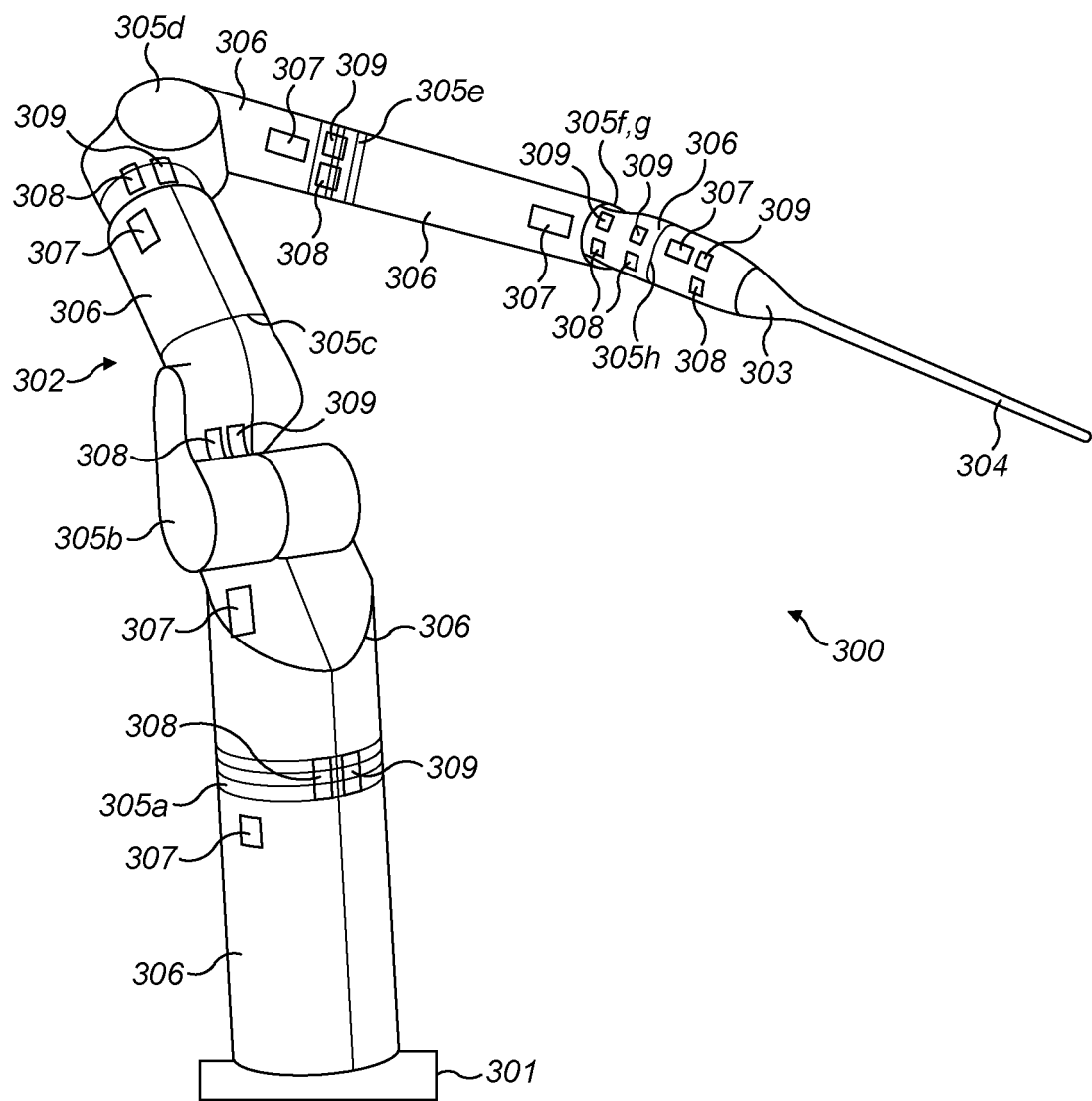
FIG. 3 illustrates a surgical robot.

FIG. 3 illustrates an example robot 300. The robot comprises a base 301 which is fixed in place when a surgical procedure is being performed. Suitably, the base 301 is mounted to a chassis. That chassis may be a cart, for example a bedside cart for mounting the robot at bed height. Alternatively, the chassis may be a ceiling mounted device, or a bed mounted device.

A robot arm 302 extends from the base 301 of the robot to an attachment 303 for a surgical instrument 304. The arm is flexible. It is articulated by means of multiple flexible joints 305 along its length. In between the joints are rigid arm links 306. The arm in FIG. 3 has eight joints. The joints include one or more roll joints (which have an axis of rotation along the longitudinal direction of the arm members on either side of the joint), one or more pitch joints (which have an axis of rotation transverse to the longitudinal direction of the preceding arm member), and one or more yaw joints (which also have an axis of rotation transverse to the longitudinal direction of the preceding arm member and also transverse to the rotation axis of a co-located pitch joint). In the example of FIG. 3: joints 305a, 305c, 305e and 305h are roll joints; joints 305b, 305d and 305f are pitch joints; and joint 305g is a yaw joint. Pitch joint 305f and yaw joint 305g have intersecting axes of rotation. The order of the joints from the base 301 to the attachment 303 are thus: roll, pitch, roll, pitch, roll, pitch, yaw, roll. However, the arm could be jointed differently. For example, the arm may have fewer than eight or more than eight joints. The arm may include joints that permit motion other than rotation between respective sides of the joint, for example a telescopic joint. The robot comprises a set of drivers 307, each driver 307 has a motor which drives one or more of the joints 305.

The attachment 303 enables the surgical instrument 304 to be releasably attached to the distal end of the robot arm. The surgical instrument may be configured to extend linearly parallel with the rotation axis of the terminal joint 305h of the arm. For example, the surgical instrument may extend along an axis coincident with the rotation axis of the terminal joint of the arm.

The robot arm comprises a series of sensors 308, 309. These sensors comprise, for each joint, a position sensor 308 for sensing the position of the joint, and a force or torque sensor 309 for sensing the applied force or torque about the joint's rotation axis. One or both of the position and force/torque sensors for a joint may be integrated with the motor for that joint. The outputs of the sensors are passed to the control system 118.

Figure 4B:
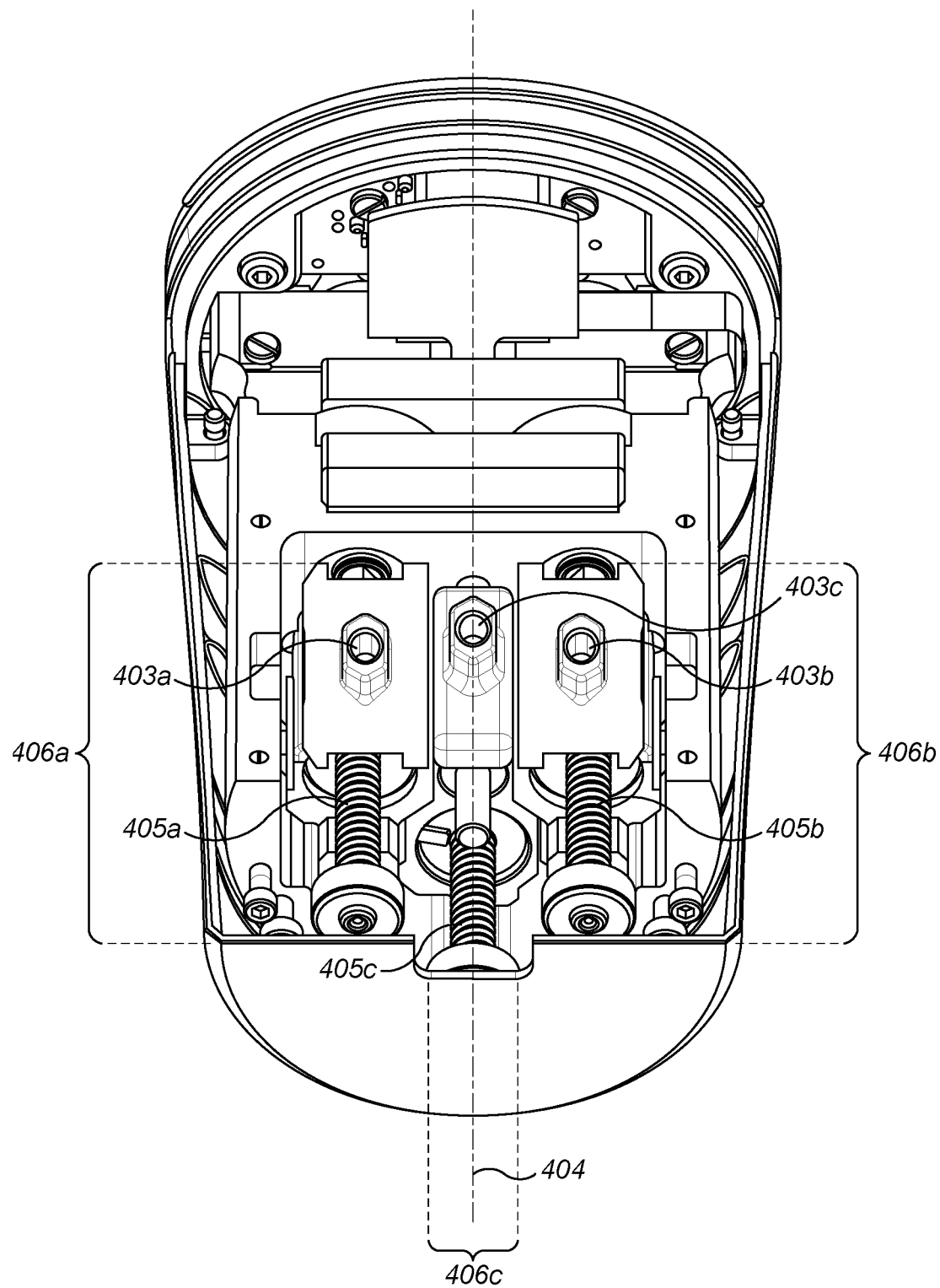
FIGS. 4a, b and c illustrate an interface between a robot arm and a surgical instrument.
Figure 4C:
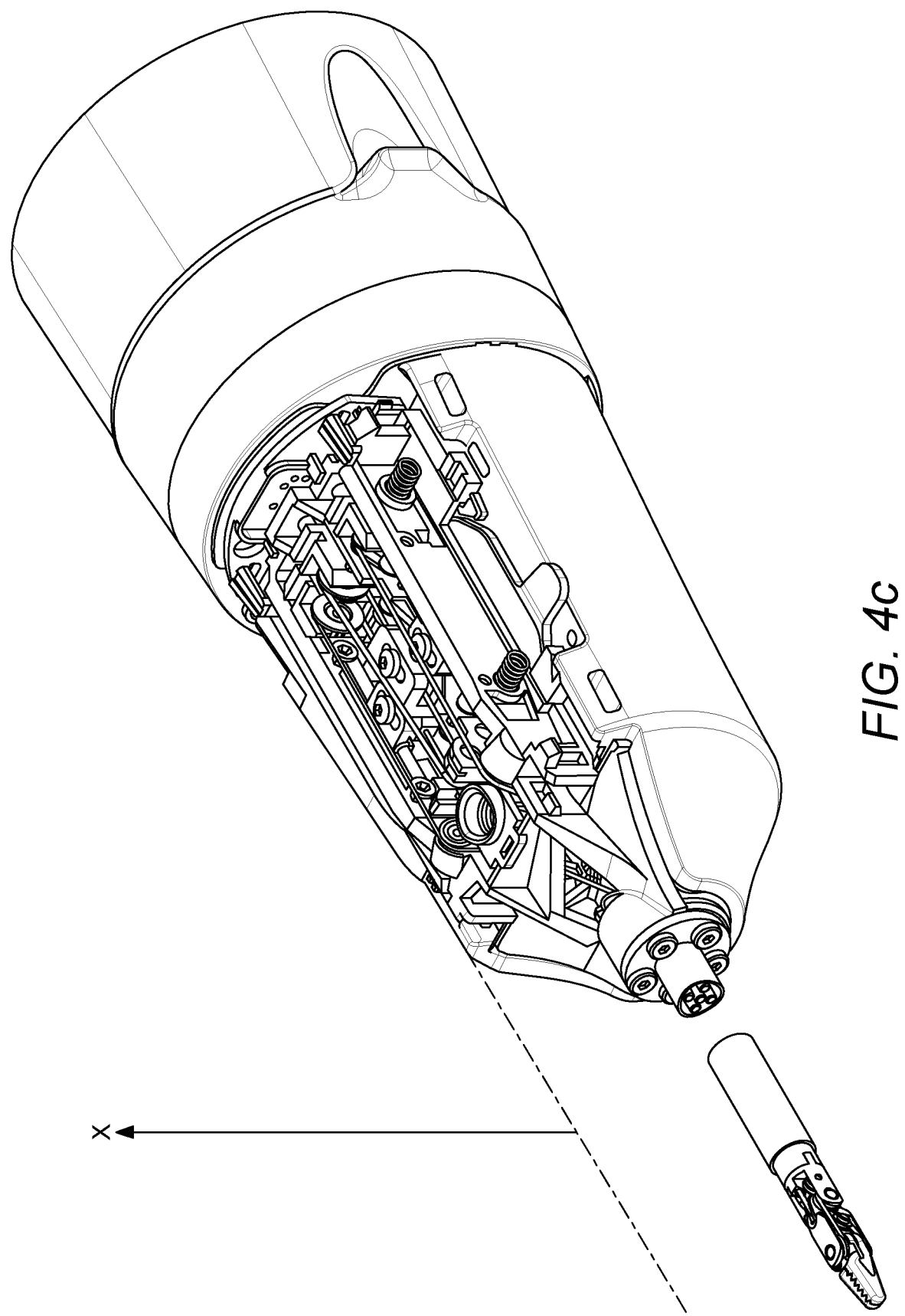

FIGS. 4a, 4b and 4c illustrate the interface between the distal end of the robot arm and the proximal end of the instrument. FIG. 4a illustrates the instrument interface 401. The instrument interface 401 is rigidly attached to the instrument shaft 202. The instrument shaft 202 does not rotate or otherwise move relative to the instrument interface 401. The instrument interface comprises instrument interface elements 402, each of which is secured to a driving element. That driving element extends down shaft 202 for driving a joint of articulation 203. The instrument interface elements 402 are exposed so as to be capable of interfacing with the robot arm.

FIG. 4b illustrates the drive assembly interface at the distal end of the robot arm. The drive assembly comprises: a first instrument drive 406a for driving the first yaw joint 207 of the instrument, a second instrument drive 406b for driving the second yaw joint 211 of the instrument, and a third instrument drive 406c for driving the pitch joint 204 of the instrument. Each instrument drive comprises a drive assembly interface element 403 driven by a lead screw 405. Drive assembly interface elements 403 each have a complimentary shape to the instrument interface elements 402. For example, the drive assembly interface elements 403 may be shaped so as to receive instrument interface elements 402.

The drive assembly interface elements 403 are each driveable along a direction parallel to the longitudinal axis 404 of the distal end of the robot arm along lead screws 405. The instrument interface is lowered into the drive assembly causing the instrument interface elements 402 to engage in the drive assembly interface elements 403. FIG. 4c illustrates the instrument interface engaged in the drive assembly interface. The robot arm may now drive movement of the articulation 203 by driving movement of the drive assembly interface elements 403 along the lead screws 405.

Figure 5:
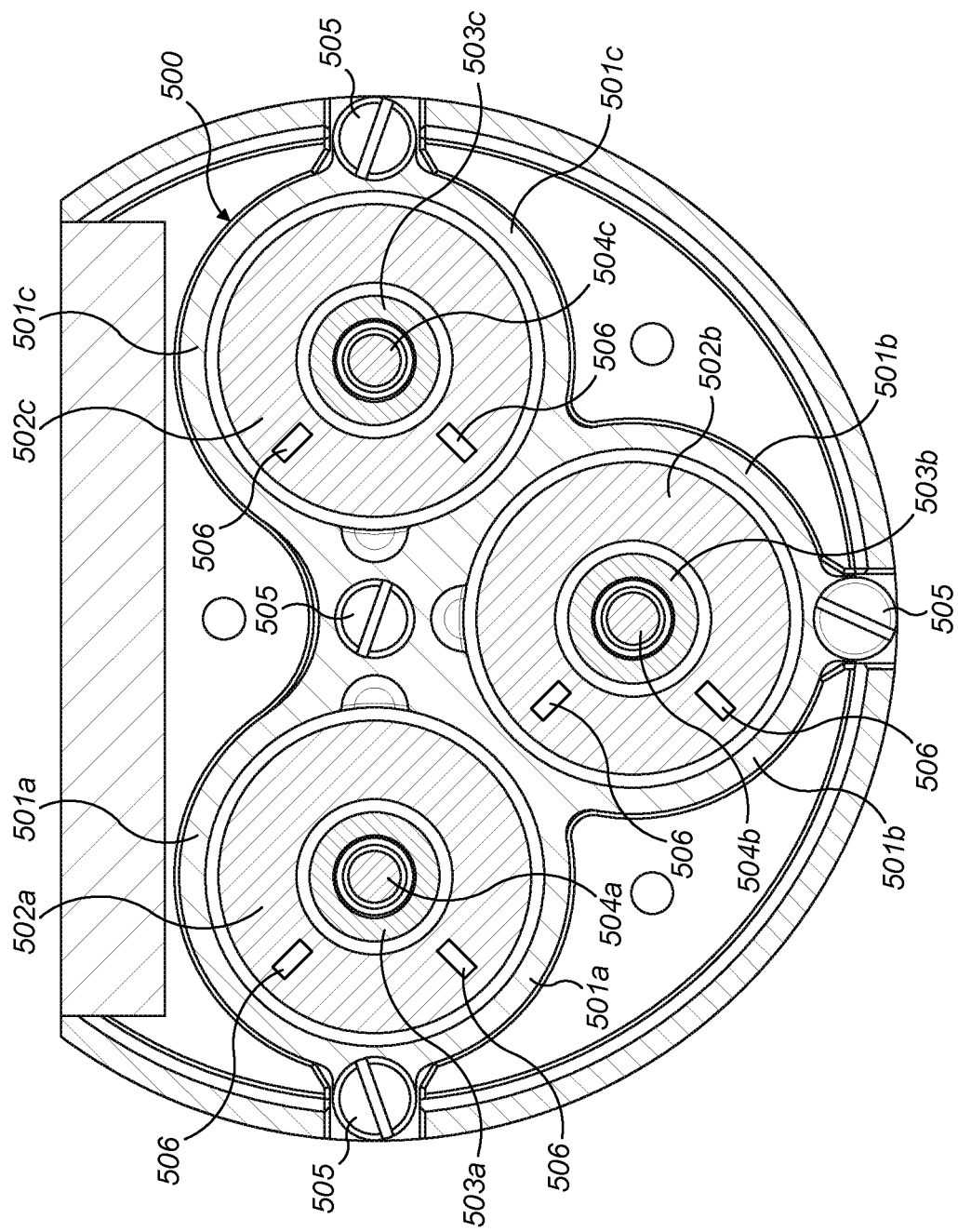
FIG. 5 illustrates a load cell unit in a drive assembly.

Each of the instrument drives 406a,b,c has a force sensor for sensing the force applied to the instrument drive. The sensed forces are output to the control system 118. A combined load cell unit, as shown in FIG. 5, may be used as the force sensor for each of the instrument drives. The combined load cell unit 500 comprises a unitary body element which constitutes a substantially rigid frame and, integral with the frame, a set of webs. The frame constitutes three annular rings 501a, 501b, 501c whose walls, when installed in the drive assembly extend parallel with the axes of the lead screws 405a,b,c. The rings are integral with each other. The webs 502a,b,c extend across the interiors of respective ones of the annular rings. At the centre of each web is a flange 503a,b,c and a through-hole 504a,b,c. When the combined load cell unit is installed in the drive assembly a lead screw 405a,b,c passes through each through-hole 504a,b,c, and the respective flange 503a,b,c is clamped between bearings in the drive assembly. The central part of each web is axially mounted to its respective lead screw; whereas the exterior part of the web is integral with the respective annular ring of the frame, which is held by bolts 505 to the body block of the frame.

Strain gauges 506 are bonded to the webs 502a,b,c. Since the webs are thin, and somewhat flexible, a web can deflect when an axial load is applied on its flange 503a,b,c by the lead screw 405a,b,c that passes through that hole. That flexing can be sensed by the strain gauges 506, which provide an electrical output indicative of the axial load on the respective lead screw. Because the webs are isolated from each other by the substantially rigid annular rings 501a,b,c, load on each lead screw can be sensed independently. Instead of webs the deflectable elements could be in the form of fingers or beams. The thicker and/or stiffer regions between the webs inhibit the propagation of force between webs, which reduces the risk of a measurement made by one strain gauge being corrupted by force from a force path associated with another strain gauge.

The frame of the load cell unit acts as a carrier for the three sensors corresponding to respective ones of the three lead screws. The lead screws 405a,b,c are driven to rotate in order to convey linear motion to the drive assembly interface elements 403a,b,c. It is desirable for the load cells to be isolated from that rotation so that it does not influence their measurements of axial load on the lead screws. To that end, the flexible web 502a,b,c associated with each load cell is attached to the respective lead screw in the following manner. The flexible web has at its radially inward part a ring or flange 503a,b,c which is thicker than the flexible portion 502a,b,c of the web. The flange 503a,b,c is located between two bearings. The bearings are clamped firmly against the flange. Each bearing permits free rotation of one of its axial faces with respect to the other, but is substantially incompressible in an axial direction. This means that when the lead screw rotates, the flange 503a,b,c and hence the web 502a,b,c is isolated from that rotation; whereas when the lead screw moves axially, that motion is passed faithfully to the flange so it can be measured as deformation of the web.

The fact that the web is substantially isolated from rotary motion of the lead screw improves the accuracy of force measurement. The flange 503a,b,c is thicker than the web 502a,b,c which causes the adjoining faces of the bearings to be spaced from the web. That permits the web 502a,b,c to deflect in the axial direction without impinging on the faces of the bearings.

The surgical instrument may comprise, for each joint, a torque sensor for sensing the applied torque about that joint's rotation axis. The outputs of these sensors are passed to the control system 118. However, incorporating torque sensors on the instrument increases the size of the instrument and may make the instrument more difficult to sterilise. Alternatively, the sensed force at the first instrument drive may be used as a measurement of the force applied to the first end effector element about the first yaw joint axis 208. Similarly, the sensed force at the second instrument drive may be used as a measurement of the force applied to the second end effector element about the second yaw joint axis 212. Utilising the force sensors at the instrument drive in this manner avoids needing to add force sensors to the instrument.

The surgeon console comprises one or more surgeon input devices. Each surgeon input device enables the surgeon to provide a control input to the control system. A surgeon input device may, for example, be a hand controller, a foot controller such as a pedal, a touch sensitive input to be controlled by a finger or another part of the body, a voice control input device, an eye control input device or a gesture control input device. The surgeon input device may provide several inputs which the surgeon can individually operate.

Figure 6:
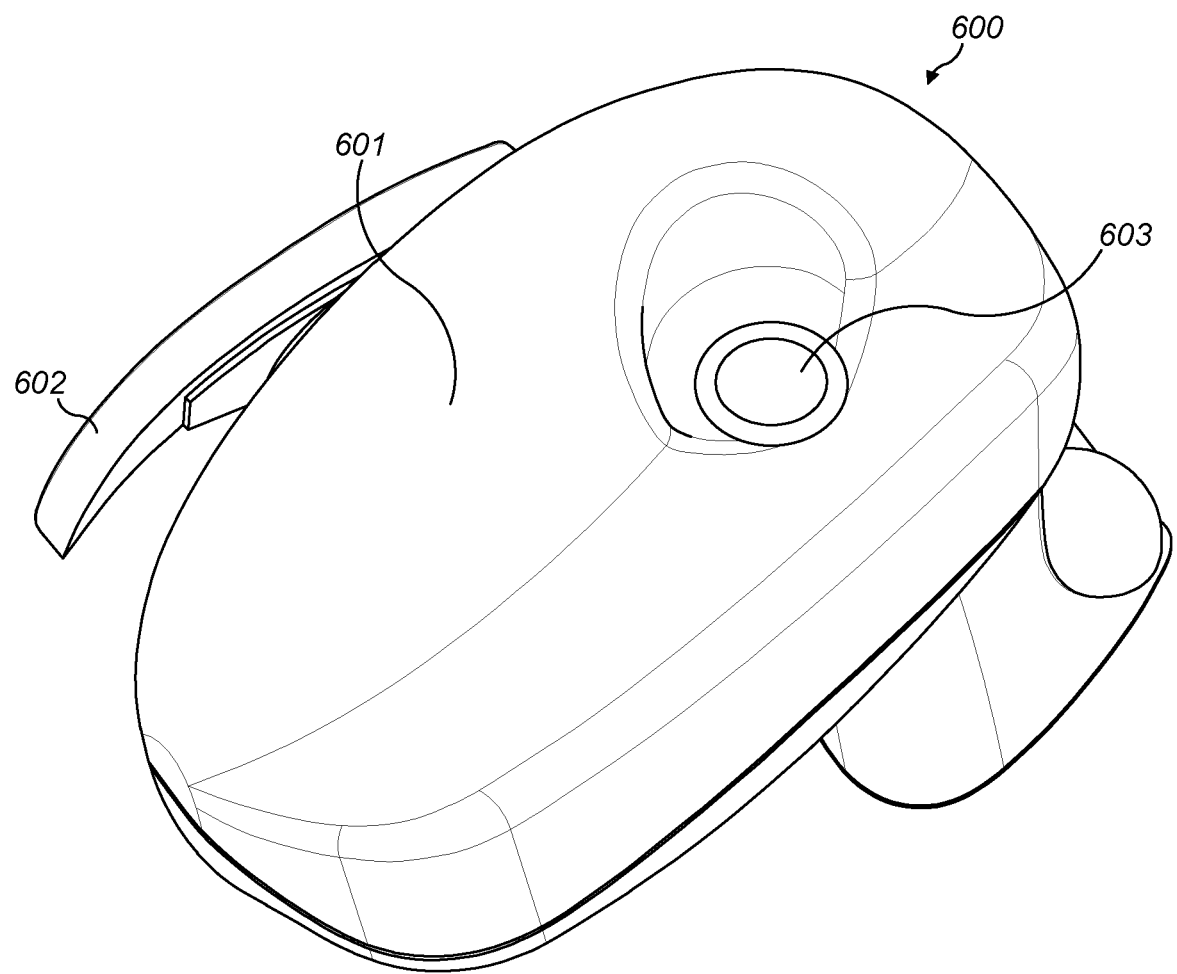
FIG. 6 illustrates a surgeon input device.

FIG. 6 illustrates an exemplary hand controller 600. The hand controller is connected to the surgeon console, for example by a gimbal arrangement (not shown). This enables the hand controller to be moved with three degrees of translational freedom with respect to the surgeon console. Such movement may be used to command corresponding movement of the end effector 201 of the instrument. The hand controller shown is intended to be held by a right hand. A mirror image hand controller could be held by a left hand. The hand controller comprises a body 601 suitable for being gripped by a hand. The hand controller may comprise additional inputs, for example buttons, switches, levers, slide inputs or capacitive sensor inputs such as track pads 603. The hand controller comprises two portions movable relative to each other. For example, the hand controller may comprise a trigger 602 movable relative to the body 601. In the hand controller shown, the trigger 602 is rotatable relative to the body 601. Alternatively, or in addition, the trigger could translate linearly relative to the body 601. Relative movement of the two portions, in this case relative movement of the trigger 602 and the body 601 is used to command opening and closing of the end effector elements 209, 210 of the instrument. The hand controller may comprise two triggers, each trigger for independently controlling a single different one of the end effector elements 209, 210.

A control system connects the surgeon console to the surgical robot. The control system comprises a processor and a memory. The memory stores, in a non-transient way, software code that can be executed by the processor to cause the processor to control the surgeon console and robot arm and instrument in the manner described herein. The control system receives the inputs from the surgeon input device(s) and converts these to control signals to move the joints of the robot arm and/or the joint(s) of the articulated coupling and/or the joint(s) of the end effector. The control system sends these control signals to the robot arm, where the corresponding joints are driven accordingly. Manipulation of the surgical instrument is thereby controlled by the control system in response to manipulation of the surgeon input device.

Figure 10:
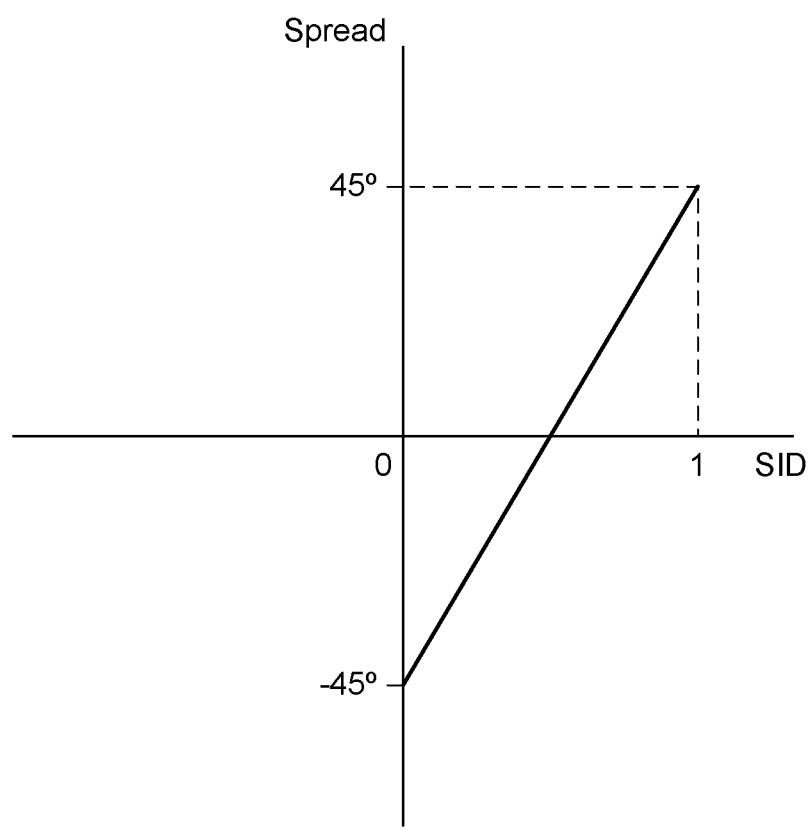
FIG. 10 illustrates an example correspondence between the spread of a pair of end effector elements and a surgeon input device.

The control system transforms commands from the surgeon input device to drive signals for manipulating the surgical instrument according to a control relationship. A position control relationship is one in which the position of the surgeon input device dictates the position of the surgical instrument. For example, the position of the hand controller in the hand controller workspace is directly converted to the position of the end effector in the end effector workspace. Similarly, the relative position of the two portions of the surgeon input device is directly converted to the relative position of the first and second end effector elements 209 and 210. For example, the control system may drive the opening angle between the first and second end effector elements 209 and 210 to match the opening angle between the trigger 602 and the body 601 of the hand controller. The control relationship is generally such that movement of the trigger 602 relative to the body 601 over its whole range of motion is mapped to movement of the opening angle between the end effector elements over its whole range from fully open to closed. This mapping may be as shown in FIG. 10. FIG. 10 illustrates an example correspondence between the spread of the end effector elements on the y-axis against the relative positions of the trigger and body of the surgeon input device on the x-axis. 0 on the x-axis is when the trigger is fully closed and 1 is when it is fully open. 45° is the maximum opening angle of the end effector elements, 0° is the minimum opening angle of the end effector elements, and the region between 0° and −45° is when the end effector elements are fully closed and exerting additional closing force. −45° is when the maximum closing force is exerted by the end effector elements.

Figure 7:
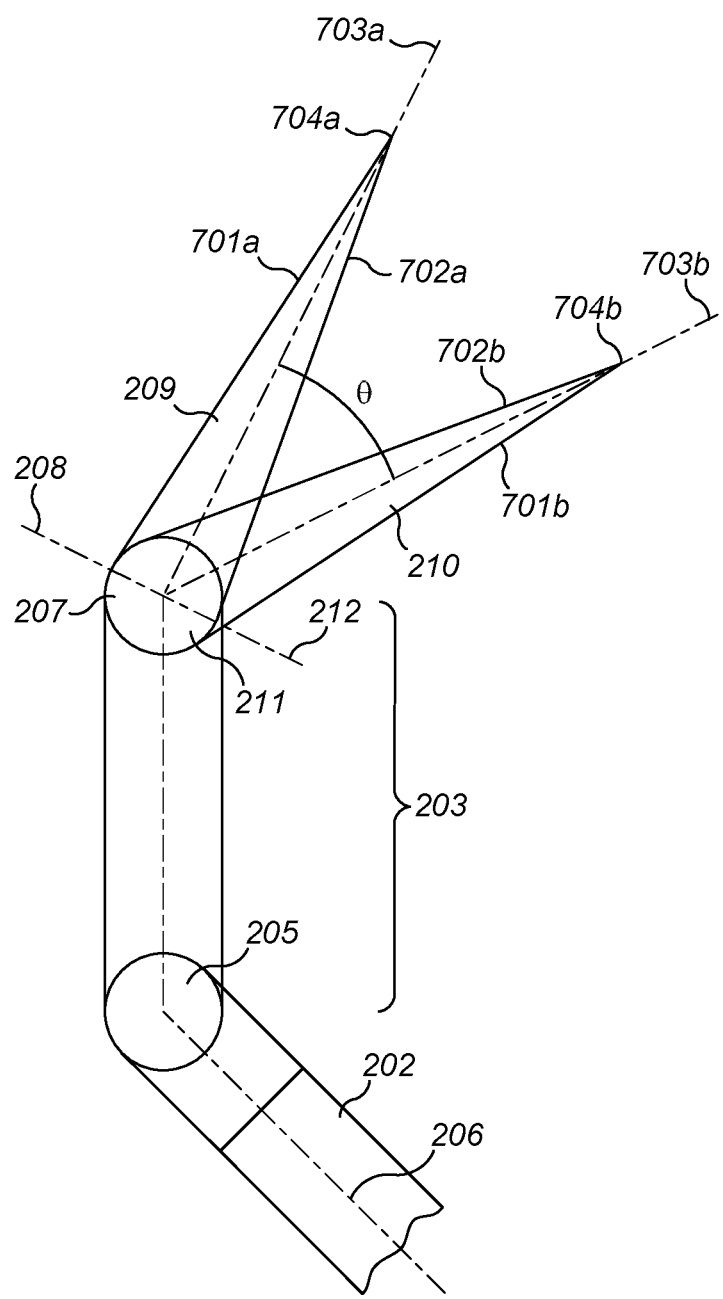
FIG. 7 illustrates the opening angle θ of a pair of end effector elements.

In the absence of external forces acting on the end effector elements, a drive signal from the control system to the end effector elements intended to cause the end effector elements to rotate so as to cause the opening angle between the end effector elements to be θ drives the opening angle between the end effector elements to θ. This opening angle θ is shown in FIG. 7. θ is the angle between the longitudinal axes 703a,b of the end effector elements 209, 210. The longitudinal axis of the first end effector element 209 intersects the rotation axis 208 of the first yaw joint 207 about which the first end effector element 209 rotates. The longitudinal axis of the first end effector element 209 bisects the first end effector element along its length to its tip 704a. The longitudinal axis of the second end effector element 210 intersects the rotation axis 212 of the second yaw joint 211 about which the second end effector element 210 rotates. The longitudinal axis of the second end effector element 210 bisects the second end effector element along its length to its tip 704b. θ may take any value up to $\theta_{max}$ which is the maximum opening angle between the end effector elements. $\theta_{max}$ is constrained mechanically by: the maximum rotation that can be applied by the driving elements A1, A2 and B1, B2, and the maximum travel of the drive assembly interface elements 403a,b and the instrument interface elements 402. $\theta_{max}$ is also constrained by the maximum travel of the portions of the surgeon input device (e.g. body 601 and trigger 602) which move relative to each other to command corresponding movement of the end effector elements.

When external forces act on the end effector elements, the drive signal from the control system to the end effector elements may not drive the end effector elements to rotate to the desired opening angle. For example, tissue bearing down on the opposite surfaces 701a,b of the end effector elements to their mating surfaces 702a,b resists the opening of the end effector elements. Such resistive force is particularly high during blunt dissection. Blunt dissection is a technique used during surgery in which tissue planes are separated to expose underlying structures without cutting the tissue. This is done by pushing the end of the end effector (typically graspers or scissors) into the tissue to make an incision, followed by opening the end effector elements (jaws or blades) to pull the tissue apart. If the control system applies the same driving signals to the instrument during blunt dissection to open the end effector elements to the opening angle θ as it does when there are no external forces acting on the end effector elements, the end effector elements will not open to θ. The opposing force of the tissue applied to the opposite surfaces 701a,b of the end effector elements may be so high that the end effector elements 209 and 210 do not open at all. Thus, the force of the tissue opposing the opening motion of the end effector elements may be so high that the end effector elements cannot be used to either pull apart the tissue or hold the tissue out of the way. Thus, blunt dissection cannot be performed.

Figure 8:
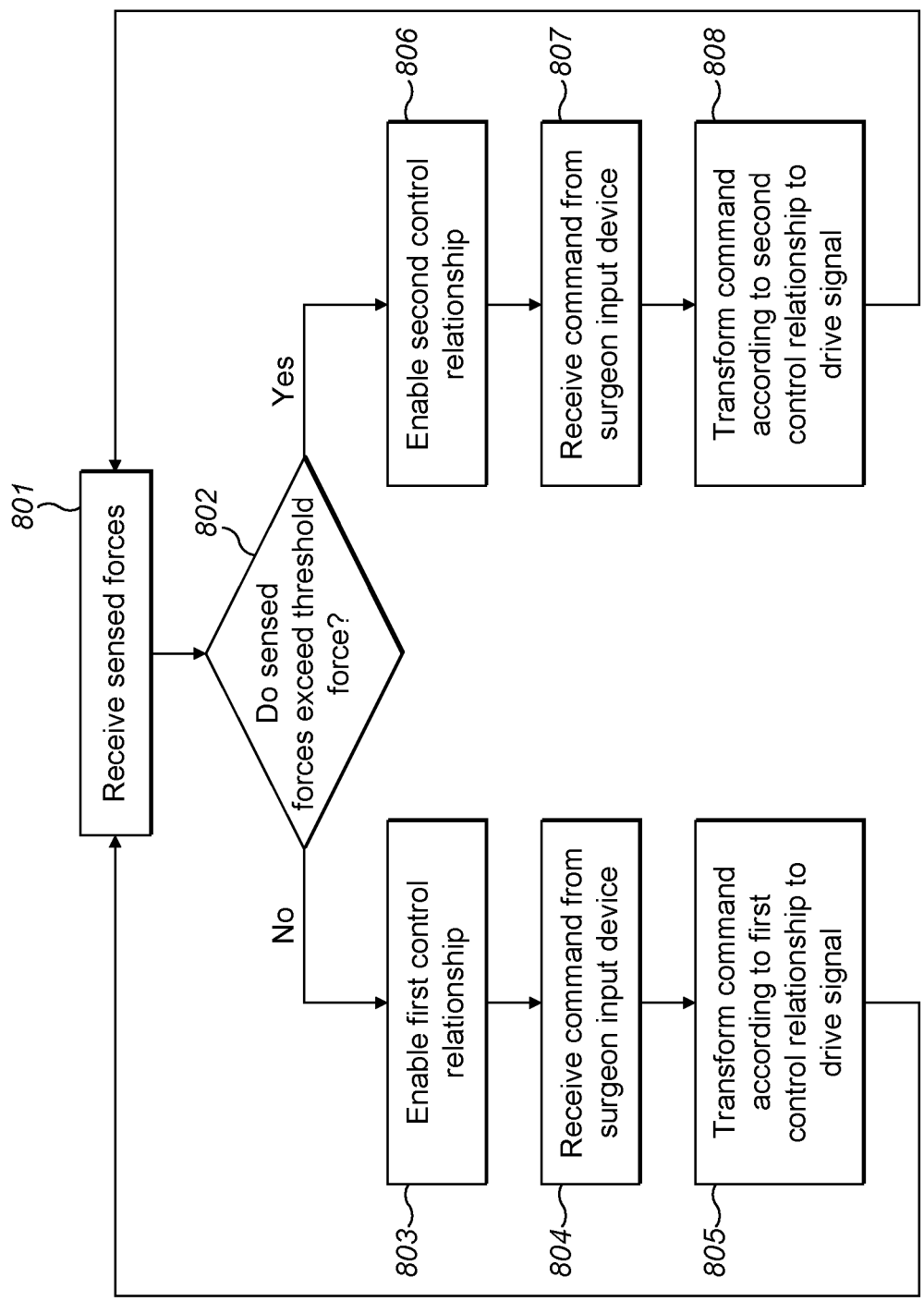
FIG. 8 is a flowchart of a method of controlling a control relationship between a surgeon input device and an end effector.

FIG. 8 describes a method of controlling a surgical instrument in response to manipulation of a surgeon input device which selects the control relationship used by the control system in converting commands from the surgeon input device to driving signals for the end effector elements in dependence on the force applied to the end effector elements opposing the motion of the end effectors. The control system changes to a control relationship which applies a greater force to change the opening angle of the end effector elements in the presence of sufficient external force.

At step 801, the control system receives sensed forces applied to the first and second end effector elements. The forces acting about the instrument's yaw joints 207 and 211 are measured. These forces may be directly measured by force or torque sensors located at the yaw joints 207 and 211 of the end effector elements. Alternatively, the forces may be measured by force sensors located at the instrument drives 406a, 406b for the yaw joints.

For example, the forces applied to the first and second end effector elements may be measured by the combined load cell unit described with reference to FIG. 5. The control system may calculate the sensed forces applied to the first and second end effector elements from a combination of the forces applied about the end effector yaw joints 207 and 211. Specifically, the sensed forces $f_{sens}$ may be:

$$f_{sens}=f_1+f_2 \qquad \text{(equation 1)}$$

where $f_1$ is a measured force applied to the first end effector (for example by being sensed at the first joint of the instrument drive), and $f_2$ is a measured force applied to the second end effector (for example by being sensed at the second joint of the instrument drive).

The sensed forces may be applied in a direction so as to close the first and second end effector elements together, i.e. rotate the first and second end effector elements together thereby reducing their opening angle. The sensed forces may be applied in a direction so as to open the first and second end effector elements apart, i.e. rotate the first and second end effector elements apart thereby increase their opening angle.

The control system moves on to step 802. At step 802, the control system compares the sensed forces to a force threshold. The control system may do this by first calculating an opening strain force $f_e$ between the first and second end effector elements as:

$$f_e=\max(f_{sens}-f_d,0) \qquad \text{(equation 2)}$$

$f_d$ is a deadband force, which is the received sensed force applied to the first and second end effector elements when (i) no external load is applied to the first and second end effector elements, and (ii) the opening angle between the first and second end effector elements is the maximum opening angle $\theta_{max}$. For example, $f_d$ may be measured as the baseline force detected from the combined load cell unit of FIG. 5 for instrument drives 406a,b when the end effector elements are fully open and under no load. $f_d>0$. For example, $f_d$ may be in the range $0N<f_d<50N$. $f_d$ may be in the range $0N<f_d<25N$.

The threshold force of step 802 may be the received sensed force applied to the first and second end effector elements when (i) no external load is applied to the first and second end effector elements, and (ii) the opening angle between the first and second end effector elements is the maximum opening angle $\theta_{max}$. In other words, the deadband force $f_d$ is the threshold force. Thus, the control system may compare the opening strain force $f_e$ to the deadband force $f_d$.

The opening strain force $f_e$ is compared to the deadband force $f_d$ rather than to 0 at step 802 in order to ensure that received sensed forces which are non-zero do not trigger a change to the second control relationship (see below) unless they are sufficiently high to indicate that there is a load acting on the end effector elements. Non-zero force sensor measurements detected when there is no actual load acting on the end effector elements, for example that result from interference, do not trigger a change to the second control relationship.

If the opening strain force $f_e$ is less than the deadband force $f_d$, then the control system moves to step 803. At step 803, the control system enables a first control relationship. This control relationship may be a position control relationship in which the relative position of the two portions of the surgeon input device map directly to the relative position of the first and second end effector elements.

The control system then moves on to step 804. At step 804, the control system receives a command from the surgeon input device to alter the opening angle between the first and second end effector elements. The control system then moves on to step 805, where it transforms the command from the surgeon input device according to the first control relationship in order to generate drive signals to drive the first and second end effector elements to rotate. Those drive signals are then sent to the instrument drives 406a,b to drive the rotation of the end effector elements accordingly. The control loop then returns to step 801 where further sensed forces are received.

If, at step 802, the opening strain force $f_e$ is greater than the deadband force $f_d$, then the control system moves to step 806. At step 806, the control system enables a second control relationship. This control relationship may be a position control relationship in which the relative position of the two portions of the surgeon input device map directly to the relative position of the first and second end effector elements.

The control system then moves on to step 807. At step 807, the control system receives a command from the surgeon input device to alter the opening angle between the first and second end effector elements. The control system then moves on to step 808, where it transforms the command from the surgeon input device according to the second control relationship in order to generate drive signals to drive the first and second end effector elements to rotate. Those drive signals are then sent to the instrument drives 406a,b to drive the rotation of the end effector elements accordingly. The control loop then returns to step 801 where further sensed forces are received.

Thus, in each iteration of the control loop of FIG. 8, either the first or second control relationship is enabled as determined by whether or not the sensed forces exceed the threshold force. Thus, the control system may initially use the first control relationship, then switch to using the second control relationship on another iteration of the control loop, then move back to using the first control relationship on a further iteration of the control loop. Similarly, the control system may initially use the second control relationship, then switch to using the first control relationship on another iteration of the control loop, then move back to using the second control relationship on a further iteration of the control loop.

The first and second control relationships are different in that under the same command from the surgeon input device to open the end effector elements away from each other, the control system drives the first and second end effector elements to rotate away from each other according to the first control relationship to an opening angle of θ, but drives the first and second end effector elements to rotate away from each other according to the second control relationship to an opening angle θ', where:

$$\theta' = \theta + \Delta\theta \quad \text{(equation 3)}$$

where Δθ>0.

Δθ is calculated to match and thereby counteract the effective change in opening angle caused by the external forces acting on the end effector elements. Thus, the second control relationship 'over-opens' the end effector elements by commanding an additional spread Δθ. The additional force driving the end effectors elements as a result of Δθ is used to counteract the external forces acting on the end effector elements, such as tissue pressing against the jaws/blades during blunt dissection. The net result, therefore, is that the angle to which the end effector elements actually open is the same as the desired angle commanded by the surgeon input device.

The first and second control relationships are different in that under the same command from the surgeon input device to close the end effector elements towards each other, the control system drives the first and second end effector elements to rotate towards each other according to the first control relationship to an opening angle of θ, but drives the first and second end effector elements to rotate towards each other according to the second control relationship to an opening angle of θ", where:

$$\theta'' = \theta - \Delta\theta \quad \text{(equation 4)}$$

where Δθ>0.

Δθ is calculated to match and thereby counteract the effective change in opening angle caused by the external forces acting on the end effector elements. Thus, the second control relationship 'over-closes' the end effector elements by commanding a reduced spread Δθ. The additional force driving the end effectors elements as a result of Δθ is used to counteract the external forces acting on the end effector elements, such as from some tissue being held between jaws. The net result, therefore, is that the angle to which the end effector elements actually open is the same as the desired angle commanded by the surgeon input device, but with greater gripping force on the object being held between the jaws.

Suitably, Δθ is a function of the sensed forces. For example, Δθ may be a function of the opening (or closing) strain force $f_e$.

The driving elements A1, A2 and B1, B2 may stretch a small amount under load. For example, this may happen if the driving elements are cables. This stretching creates a mismatch between the actual location of the end effector elements and the expected location of the end effector elements as measured by position sensors at the instrument drives. The load path for opening (or closing) the end effector elements may be modelled as a spring in order to account for the stretch in the driving elements. This enables the spread of the end effector elements θ' (or θ") to be calculated more accurately. Thus, Δθ may be a function of a spring constant $K_e$ of the system.

The spring constant $K_e$ of the system may be determined as follows. The additional spread Δθ commanded by the control system in the second control relationship has a maximum value $\Delta\theta_{max}$. Each instrument drive 406a,b is driven by a motor in the robot arm. Each instrument drive may be driven by a different motor. A joint controller receives the drive signal from the control system and drives the motor in accordance with the received drive signal. The motor produces a torque which rotates the lead screws 405a,b thereby causing the drive assembly interface elements 403a,b to move linearly along the lead screw. Each drive assembly interface element 403a,b transfers drive to the instrument interface element with which it is mated. The instrument interface elements displace the driving elements A1,A2/B1,B2 thereby causing the end effector elements 209, 210 to rotate. Each motor in the robot arm has a maximum torque it is capable of generating. $\theta + \Delta\theta_{max}$ is the opening angle between the first and second end effector elements driven by the motor(s) driving those end effector elements at maximum torque when no external load is applied to the first and second end effector elements which opposes the opening motion of the end effector elements. $\Delta\theta_{max}$ may be determined by holding the end effector elements in a closed configuration in which their mating surfaces 702a,b contact and driving the motor(s) at maximum torque. The expected opening angle θ+Δθ for that maximum torque, as measured by the movement of the instrument drives provides a value for $\Delta\theta_{max}$. $\Delta\theta_{max}$>0. For example, $\Delta\theta_{max}$ may be in the range 0.2 rad<$\Delta\theta_{max}$<5 rad. $\Delta\theta_{max}$ may be in the range 0.5 rad<$\Delta\theta_{max}$<3 rad. The spring constant $K_e$ is determined by increasing its value until the maximum spread of the end effector elements $\theta + \Delta\theta_{max}$ can no longer be requested when the end effector elements are prevented from opening. $K_e$>0. For example, $K_e$ may be in the range 10 rad/N<$K_e$<200 rad/N. $K_e$ may be in the range 20 rad/N<$K_e$<100 rad/N.

Δθ may be related to the opening (or closing) strain force $f_e$ and the spring constant $K_e$ of the system as follows:

$$\Delta\theta = \min\left(\frac{f_e}{K_e}, \Delta\theta_{max}\right) \quad \text{(equation 5)}$$

Thus, for θ>0, equation 3 becomes:

$$\theta' = \theta + \min\left(\frac{f_e}{K_e}, \Delta\theta_{max}\right) \quad \text{(equation 6)}$$

And, for θ>0, equation 4 becomes:

$$\theta' = \theta - \min\left(\frac{f_e}{K_e}, \Delta\theta_{max}\right) \quad \text{(equation 7)}$$

The calculation of Δθ as shown in equation 5 leads to a discontinuous relationship between the mapping of the relative position of the trigger and body of the surgeon's hand controller and the opening angle of the two end effector elements when switching between the first and second control relationships. Thus, switching between the first and second control relationships may be perceived as disjointed by the surgeon. FIG. 9a illustrates the correspondence between the spread of the end effector elements on the y-axis against the relative positions of the two portions of the surgeon input device on the x-axis. The portion of the graph labelled 901 illustrates the discontinuity between the first control relationship applied (in this case) at θ≤0, and the second control relationship which is applied from θ>0 when the force threshold is exceeded.

The calculation of Δθ may lead to a continuous relationship between the mapping of the relative position of the trigger and body of the surgeon's hand controller and the opening angle of the two end effector elements when switching between the first and second control relationships. This makes switching between the first and second control relationships feel smoother for the surgeon. Equation 8 shows a calculation of Δθ which leads to such a continuous mapping:

$$\Delta\theta = \min\left(\frac{f_e}{K_e}\theta_{cont}, \Delta\theta_{max}\right) \quad \text{(equation 8)}$$

$\theta_{cont}$ is a function of the opening angle θ which provides the continuous mapping. $\theta_{cont}$ may be given by:

$$\theta_{cont} = \frac{\theta}{\theta_{max}} \quad \text{(equation 9)}$$

Figure 9B:
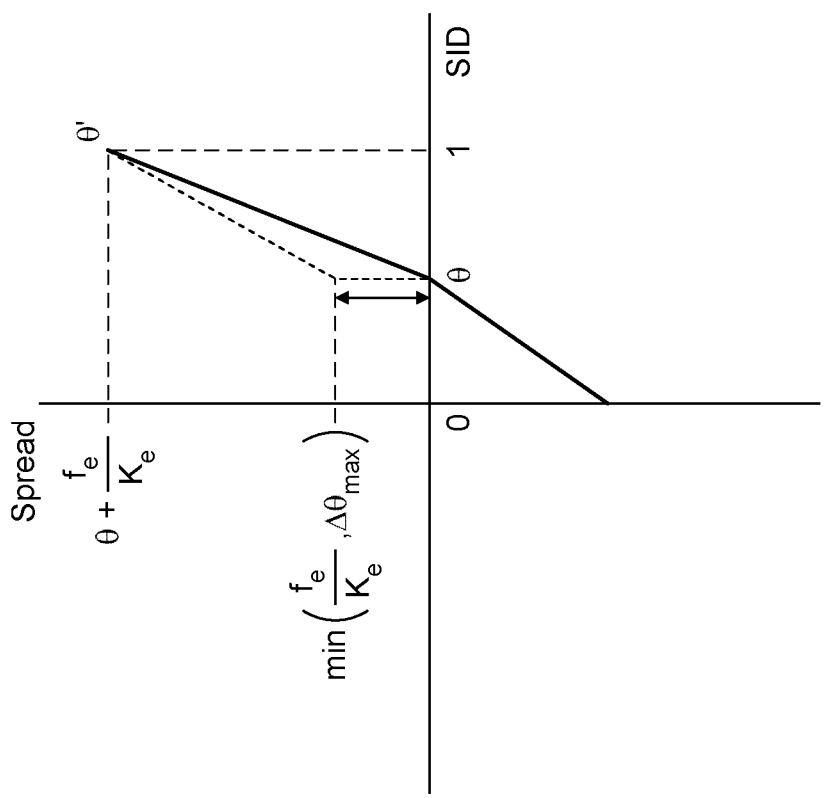
FIG. 9b illustrates an example correspondence between the spread of a pair of end effector elements and a surgeon input device in a continuous change in control relationships.
Figure 9A:
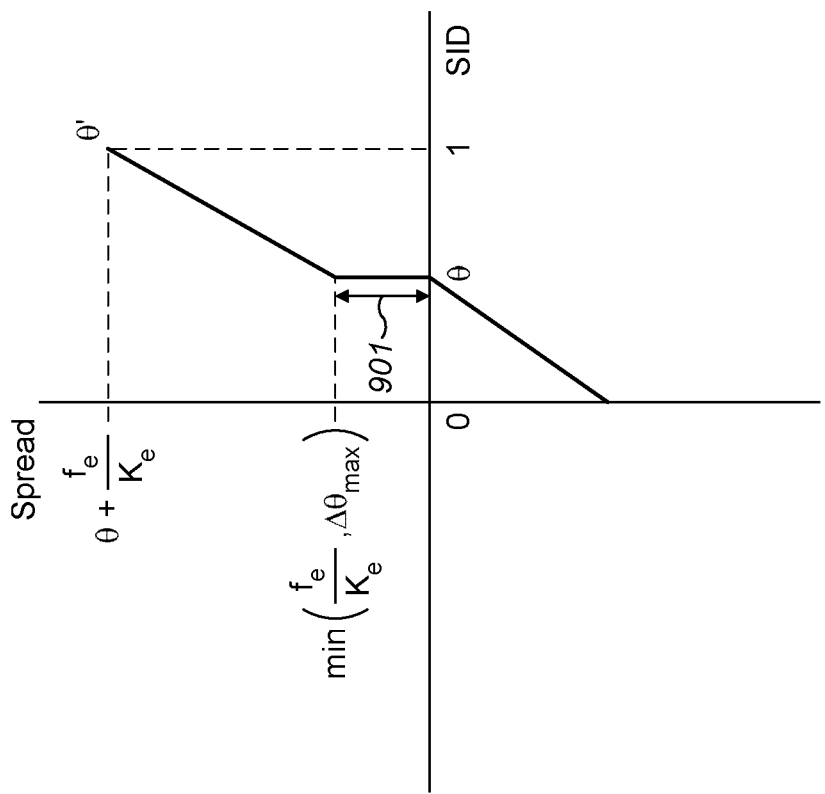
FIG. 9a illustrates an example correspondence between the spread of a pair of end effector elements and a surgeon input device in a discontinuous change in control relationships.

FIG. 9b illustrates the correspondence between the spread of the end effector elements on the y-axis against the relative positions of the two portions of the surgeon input device on the x-axis. There is no discontinuity between the first control relationship applied (in this case) at θ≤0, and the second control relationship which is applied from θ>0 when the force threshold is exceeded.

The control system described above utilises sensed forces applied to the first and second end effector elements to determine which control relationship is used by the control system. Readings from force sensors may drift or have a systematic error, for example due to temperature dependence. To mitigate such drift, relative rather than absolute force sensor readings may be used in the calculations performed by the control system in carrying out the method of FIG. 8. A baseline force reading may be taken, and then deducted from subsequent measured force readings as follows.

A baseline sensed force $f_{sens}$ reading $f_{base}$ may be taken at a baseline opening angle of the end effector elements $\theta_{base}$. $\theta_{base}$ is chosen to be an opening angle which is big enough to ensure the end effector elements are not holding an object between them, but small enough to allow the end effector elements to be opened further to perform blunt dissection. For example, $\theta_{base}$ may be 10°. $f_{base}$ is given by:

$$f_{base} = f_{1base} + f_{2base} \quad \text{(equation 10)}$$

where $f_{1base}$ is a force sensed as being applied to the first end effector element (for example via the first joint of the instrument drive) at the baseline opening angle $\theta_{base}$ between the first and second end effector elements, and $f_{2base}$ is a force sensed as being applied to the second end effector element (for example via the second joint of the instrument drive) at the baseline opening angle $\theta_{base}$ between the first and second end effector elements.

The baseline sensed force reading $f_{base}$ used by the control system may remain constant until it is recalculated. The baseline sensed force reading $f_{base}$ may be taken multiple times during a surgical operation. The baseline sensed force reading $f_{base}$ may be taken periodically. The baseline sensed force reading $f_{base}$ may be taken every time the following sequence of events happens whilst the surgeon is commanding manipulation of the instrument during surgery: (i) the opening angle between the end effector elements closes to a value $\theta_{reset}$; and (ii) following (i), the opening angle increases to $\theta_{base}$. $\theta_{reset}$ is chosen to be significantly smaller than $\theta_{base}$. For example, $\theta_{reset}$ may be 0°. By using a $\theta_{reset}$ which is significantly smaller than $\theta_{base}$, hysteresis in the force measurements is mitigated. The baseline sensed force reading may also be taken every time an instrument on the robot arm is detached and another instrument is attached. The baseline sensed force reading may also be taken every time an instrument is disengaged. In these two scenarios, the second control relationship may not be enabled until the surgeon has commanded the end effector elements to close to Oreset and reopen to $\theta_{base}$ thereby enabling $f_{base}$ to be calculated.

A current baseline sensed force reading $f_{base}$ may only be replaced with a newly calculated baseline sensed force reading $f_{base}'$ if that new reading $f_{base}'$ lies within a predefined range. If the new reading $f_{base}'$ lies outside of the predefined range, then it is discarded, and the control system continues to use the current reading $f_{base}$. For example, a $f_{base}' \leq 0N$ may be discarded in favour of the current reading $f_{base}$.

When the control system subsequently receives sensed forces at step 801, it calculates $f_{sens}$ according to:

$$f_{sens} = (f_1 + f_2) - f_{base} \quad \text{(equation 11)}$$

Alternatively, the control system may calculate $f_{sens}$ iteratively as a filtered version of:

$$\Delta f = (f_1 + f_2) - f_{base} \quad \text{(equation 12)}$$

according to the equation:

$$f_{sens_n} = \alpha \Delta f_n + (1-\alpha) f_{sens_{n-1}} \quad \text{(equation 13)}$$

where $f_{sens_n}$ is $f_{sens}$ from the current iterative cycle, $f_{sens_{n-1}}$ is $f_{sens}$ from the previous iterative cycle, and α is a filter constant.

By implementing equation 13, the control system applies a low-pass filter to Δf. Thus, spikes in the value of Δf which could potentially result in the second control relationship being erroneously triggered are avoided. α<1 and selected to smooth out spikes in the Δf signal whilst leaving a consistent reading unaffected.

In step 802, the control system calculates the opening strain force $f_e$ between the first and second end effector elements according to equation 2 using $f_{sens}$ from the current iterative cycle of the control loop. As described above, the control system compares the opening strain force $f_e$ to the deadband force $f_d$. If $f_e > f_d$, then the control system enables the second control relationship.

The control system may also require the opening angle of the end effector elements to be greater than $\theta_{base}$ in order to trigger the control system to enable the second control relationship. If $\theta \leq \theta_{base}$ then the first control relationship may always be enabled by the control system. The control system may only calculate $f_{sens}$ or $\Delta f$ if $\theta > \theta_{base}$.

In the case that:
the control system uses a relative force increment using a baseline force $f_{base}$ (as shown in equation 11 or 13) in its comparison to the force threshold in step 802, and
the second control relationship is then enabled at step 806, and
a continuous relationship between the mapping of the relative position of the trigger and body of the surgeon's hand controller and the opening angle of the two end effector elements when switching between the first and second control relationships is desired,
then $\Delta\theta$ may be calculated as:

$$\Delta\theta = \min\left(\frac{f_e}{K_e}\theta_{cont}, \Delta\theta_{max}\right) \quad \text{(equation 8)}$$

where $\theta_{cont}$ is given by:

$$\theta_{cont} = \frac{(\theta - \theta_{base})}{(\theta_{max} - \theta_{base})} \quad \text{(equation 14)}$$

The methods described herein use a force threshold to trigger a change in the control relationship between the surgeon input device and the opening angle of the end effector elements of the instrument. This enables the control system to use a control relationship suited to the task being performed as defined by the forces acting on the instrument. The first control relationship is used in the absence of external force being applied to the end effector elements, when precise movement of the end effector elements is more desirable. The second control relationship is used to enable greater force to be applied when opening the end effector elements in the presence of external force bearing down on the outside surfaces of the end effector elements. Thus, this enables a greater force to be applied during operations such as blunt dissection. By setting the opening angle of the end effector elements in the second control relationship to be a function of the sensed forces applied to the end effector elements, the additional force applied to the end effector elements is tailored to the specific environment of the end effector elements, i.e. to the specific external forces they are experiencing.

By utilising the two control relationships and switching between them based on a force threshold having been met, the control system optimises use of the limited range of relative motion of the two portions (e.g. trigger and body) of the surgeon input device.

As described herein, the control system may also use the methods described with respect to FIG. 8 to enable a second control relationship which applies more force when closing the end effector elements. This is useful for providing a tighter grip on an object held between the end effector elements. For example, it is useful to hold a suturing needle between a pair of jaws of a needle holder with a high force when that suturing needle is being used to push through tissue. This helps to prevent the suturing needle slipping through the jaws in the presence of the resistive force of the tissue. The force threshold is set to be a level which indicates that the end effector elements are being used for gripping.

Position control relationships have been described above. Force control relationships are another type of control relationship between the surgeon input device and the end effector. In a force control relationship, the control system maps a force applied to the surgeon input device directly to a force applied to the end effector elements. For example, a rotational force applied to the trigger of the hand controller is mapped directly to the relative rotational force applied to the end effector elements about their respective yaw joints.

The first and second control relationships described above may both be position control relationships. The first and second control relationships may both be force control relationships. The first control relationship may be a force control relationship, and the second control relationship a position control relationship. The first control relationship may be a position control relationship, and the second control relationship may be a force control relationship.

Figure 1:
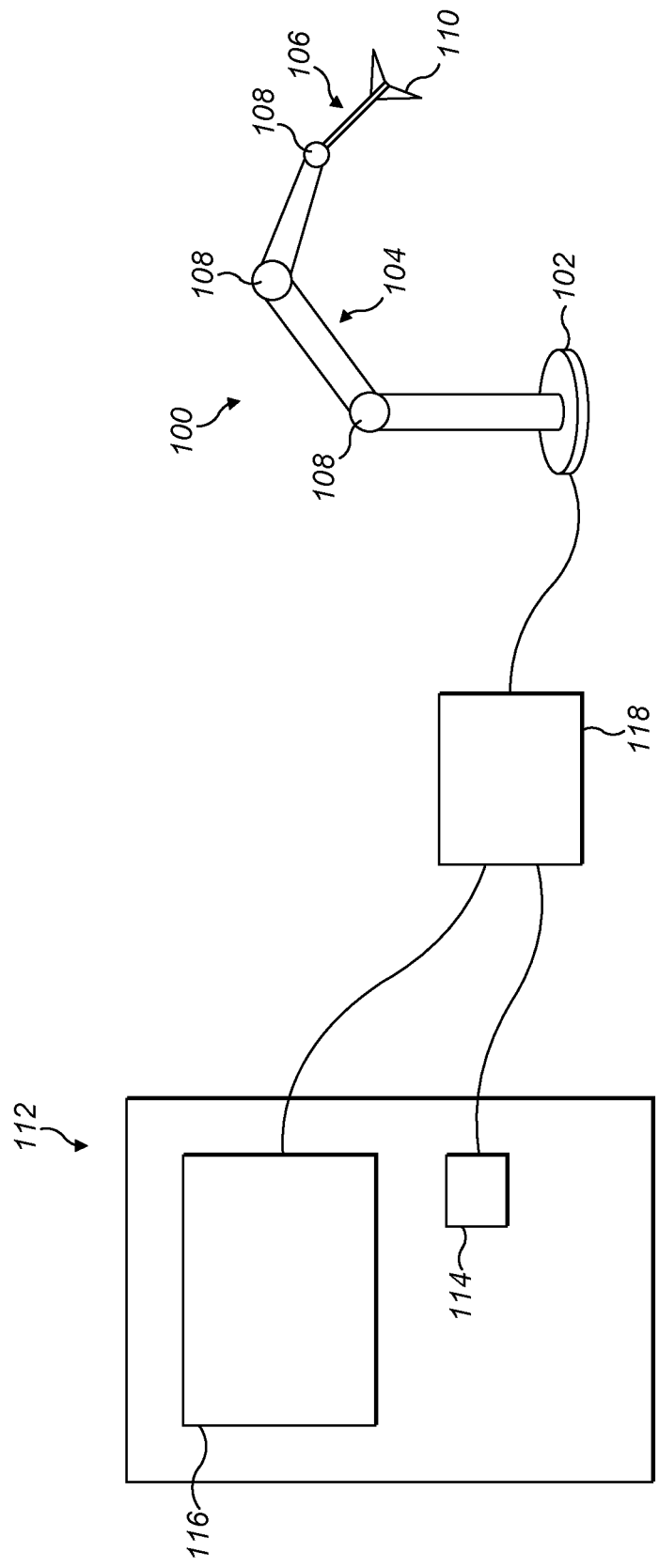
FIG. 1 illustrates a surgical robot system for performing a surgical procedure.

The control system for implementing the methods described herein may be implemented at the control system 118 as shown in FIG. 1. Alternatively, the control system for implementing the methods described herein may be implemented at the robot arm. The arm control system comprises a processor and a memory. The memory stores, in a non-transient way, software code that can be executed by the processor to cause the processor to control the robot arm and instrument in the manner described herein. The arm control system receives inputs from the control system 118. The arm control system converts these to control signals to move the joints of the robot arm and/or the joint(s) of the articulated coupling and/or the joint(s) of the end effector. Alternatively, the control system may be distributed across the robotic surgical system.

The end effector may take any suitable form. For example, the end effector could be a pair of curved scissors, an electrosurgical instrument such as a pair of monopolar scissors, a needle holder, a pair of jaws, or a fenestrated grasper.

The robot described herein could be for purposes other than surgery. For example, the port could be an inspection port in a manufactured article such as a car engine and the robot could control a viewing tool for viewing inside the engine.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A control system configured to control manipulation of a surgical instrument in response to manipulation of a remote surgeon input device, the surgical instrument comprising opposable first and second end effector elements connected to a shaft by an articulated coupling, the control system configured to:

transform commands from the surgeon input device to alter the opening angle between the first and second end effector elements according to a first control relationship to drive signals for driving the first and second end effector elements to rotate;

receive sensed forces applied to the first and second end effector elements, and compare the sensed forces to a threshold force; and upon determining that the threshold force has been exceeded, transform subsequent commands from the surgeon input device to alter the opening angle between the first and second end effector elements according to a second control relationship to drive signals for driving the first and second end effector elements to rotate, wherein the second control relationship is different to the first control relationship;

wherein, under a same command from the surgeon input device to alter the opening angle between the first and second end effector elements, the control system is configured to:

when the first control relationship is enabled, generate drive signals to drive the first and second end effector elements to rotate to an opening angle of θ according to the first control relationship, and when the second control relationship is enabled, generate drive signals to drive the first and second end effector elements to rotate according to the second control relationship to:
an opening angle of θ+Δθ, where Δθ>0, when the sensed forces are applied in a direction so as to close the first and second end effector elements together; or
an opening angle of θ−Δθ, where Δθ>0, when the sensed forces are applied in a direction so as to open the first and second end effector elements apart.

2. The control system of claim 1, wherein the surgeon input device comprises two portions movable relative to each other, the first control relationship is a position control relationship, and the second control relationship is a position control relationship, where in a position control relationship the relative position of the two portions of the surgeon input device maps directly to the relative position of the first and second end effector elements of the surgical instrument.

3. The control system of claim 1, wherein the sensed forces are applied in a direction so as to close the first and second end effector elements together.

4. The control system of claim 1, wherein the opening angle between the first and second end effector elements is in a range bounded by a maximum opening angle $\theta_{max}$, and the threshold force is the received sensed force applied to the first and second end effector elements when (i) no external load is applied to the first and second end effector elements, and (ii) the opening angle between the first and second end effector elements is the maximum opening angle $\theta_{max}$.

5. The control system of claim 1, wherein Δθ is calculated to match and thereby counteract the effective change in opening angle caused by the sensed forces acting on the end effector elements.

6. The control system of claim 1, wherein Δθ is a function of the sensed forces.

7. The control system of claim 1, wherein one or more motors are configured to drive the first and second end effector elements to rotate according to the drive signals, the one or more motors each capable of generating a maximum torque, wherein Δθ has a maximum value of $\Delta\theta_{max}$, where $\theta + \Delta\theta_{max}$ is the opening angle between the first and second end effector elements driven by the one or more motors at maximum torque when no external load is applied to the first and second end effector elements.

8. The control system of claim 1, configured to model the driving of the first and second end effector elements as a spring, wherein 40 is a function of a spring constant $K_e$.

9. The control system of claim 4, configured to provide a continuous mapping from the surgeon input device to the first and second end effector elements when transitioning from transforming commands from the surgeon input device according to the first control relationship to transforming subsequent commands from the surgeon input device according to the second control relationship.

10. The control system of claim 9, wherein $$\Delta\theta = \min\left(\frac{f_e}{K_e}\theta_{cont}, \Delta\theta_{max}\right)$$

wherein $f_e$ is an opening strain force between the first and second end effector elements derived from the received sensed forces, and $\theta_{cont}$ is a function of the opening angle θ which provides the continuous mapping.

11. The control system of claim 1, configured to only transform subsequent commands from the surgeon input device according to the second control relationship if the opening angle θ between the first and second end effector elements is greater than a baseline opening angle $\theta_{base}$.

12. The control system of claim 11, wherein $$\Delta\theta = \min\left(\frac{f_e}{K_e}\theta_{cont}, \Delta\theta_{max}\right)$$

wherein $f_e$ is an opening strain force between the first and second end effector elements derived from the received sensed forces, and wherein $$\theta_{cont} = \frac{(\theta - \theta_{base})}{(\theta_{max} - \theta_{base})}.$$

13. The control system of claim 7, the surgical instrument being a robotic surgical instrument held and driven by a robotic surgical arm, the robotic surgical arm comprising an instrument drive configured to transfer drive from the one or more motors to the first and second end effector elements, wherein the sensed forces that the control system is configured to receive are measured at the instrument drive.

14. The control system of claim 13, wherein the instrument drive comprises a first joint which transfers drive from a first motor of the one or more motors to rotation of the first end effector element, and a second joint which transfers drive from a second motor of the one or more motors to rotation of the second end effector element, wherein $$\Delta\theta = \min\left(\frac{f_e}{K_e}\theta_{cont}, \Delta\theta_{max}\right)$$

wherein $f_e$ is an opening strain force between the first and second end effector elements derived from the received sensed forces, and $\theta_{cont}$ is a function of the opening angle θ which provides the continuous mapping, and wherein the opening strain force between the first and second end effector elements is:

$$f_e = \max(f_{sens} - f_d, 0)$$

where $f_{sens}$ is a function of a force $f_1$ sensed at the first joint of the instrument drive and a force $f_2$ sensed at the second joint of the instrument drive, and $f_d$ is a received sensed force applied to the first and second end effector elements when (i) no external load is applied to the first and second end effector elements, and (ii) the opening angle between the first and second end effector elements is the maximum opening angle $\theta_{max}$.

15. The control system of claim 14, configured to calculate $f_{sens}$ according to the equation $$f_{sens} = f_1 + f_2.$$

16. The control system of claim 14, configured to calculate $f_{sens}$ according to the equation $$f_{sens} = (f_1 + f_2) - (f_{1base} + f_{2base})$$

where $f_{1base}$ is a force sensed at the first joint of the instrument drive at a baseline opening angle $\theta_{base}$ between the first and second end effector elements, and $f_{2base}$ is a force sensed at the second joint of the instrument drive at the baseline opening angle $\theta_{base}$ between the first and second end effector elements.

17. The control system of claim 14, configured to calculate $f_{sens}$ iteratively as a filtered version of $$\Delta f = (f_1 + f_2) - (f_{1base} + f_{2base})$$

according to the equation $$f_{sens_n} = \alpha \Delta f_n + (1-\alpha) f_{sens_{n-1}}$$

where $f_{1base}$ is a force sensed at the first joint of the instrument drive at a baseline opening angle $\theta_{base}$ between the first and second end effector elements, $f_{2base}$ is a force sensed at the second joint of the instrument drive at the baseline opening angle $\theta_{base}$ between the first and second end effector elements, $f_{sens_n}$ is $f_{sens}$ from the current iterative cycle, $f_{sens_{n-1}}$ is $f_{sens}$ from the previous iterative cycle, and $\alpha$ is a filter constant.

18. The control system of claim 1, wherein the sensed forces are applied in a direction so as to open the first and second end effector elements apart, and the threshold force is a gripping force, and optionally wherein under the same command from the surgeon input device, the control system is configured to drive:
the first and second end effector elements to rotate according to the first control relationship to an opening angle of $\theta$, and
the first and second end effector elements to rotate according to the second control relationship to an opening angle of $\theta - \Delta\theta$, where $\Delta\theta > 0$.

19. The control system of claim 1, wherein one or both of the first control relationship and the second control relationship is a force control relationship, where in a force control relationship a force applied to the surgeon input device maps directly to a force applied to the first and second end effector elements of the surgical instrument.

* * * * *